4 Sheet
Sheet 1

T. I. Stealey.

Harvester Rake.

No 2783 Reissued Oct. 22, 1867.

Witnesses
Edw Schafer
Edw Ruffner

Inventor
R. S. Campbell
Assignee of Thomas J. Stealey

4 Sheets
Sheet 2
T. I. Stealey.
Harvester Rake.
No 2783 Reissued Oct. 22, 1867.
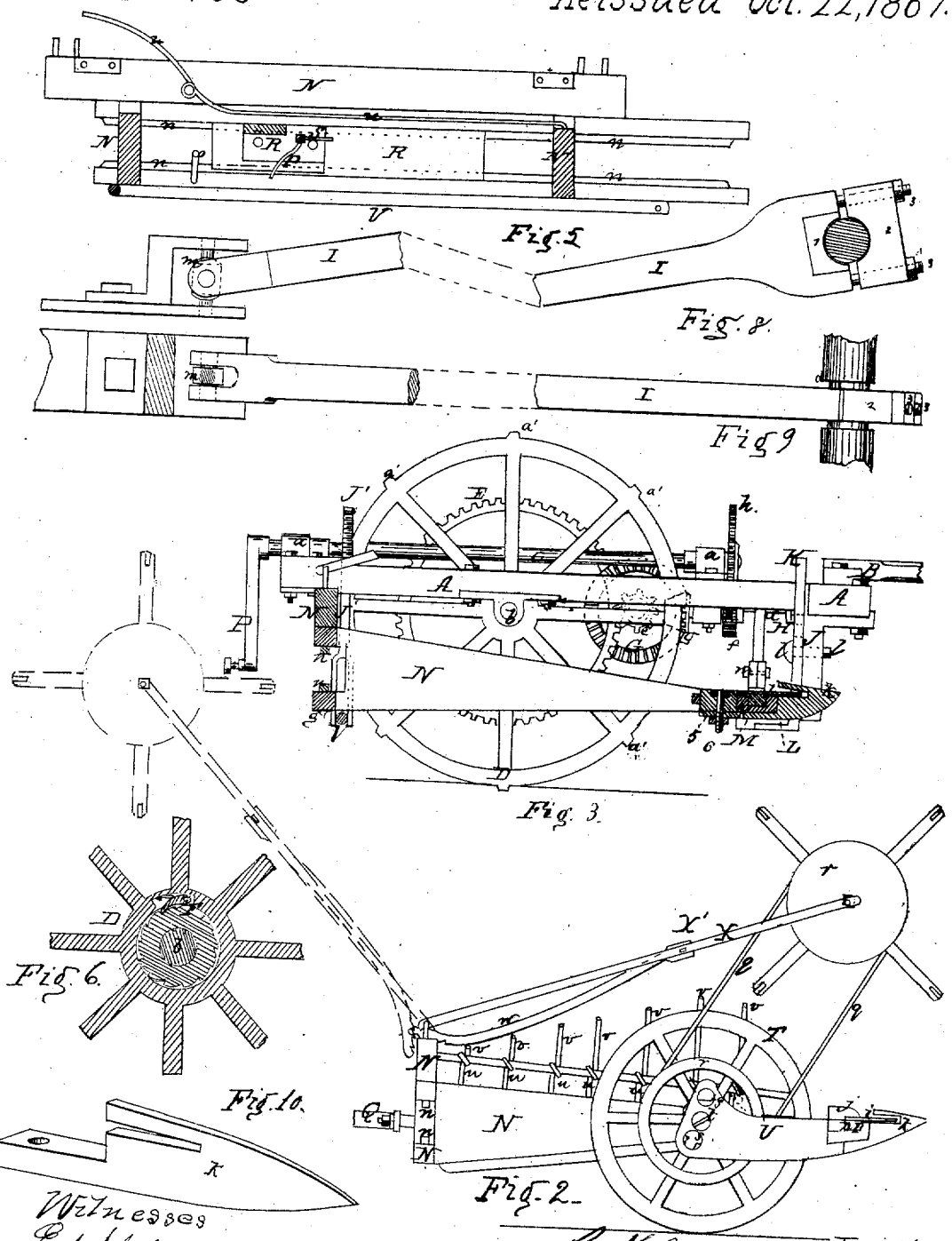
Witnesses
Edw. Shyler
E. W. Griffin
R. J. Campbell Inventor
Assignee of Thomas I. Stealey 4 Sheets
Sheet 3.
T. I. Stealey
Harvester Rake.
№ 2783 Reissued Oct. 22, 1867.
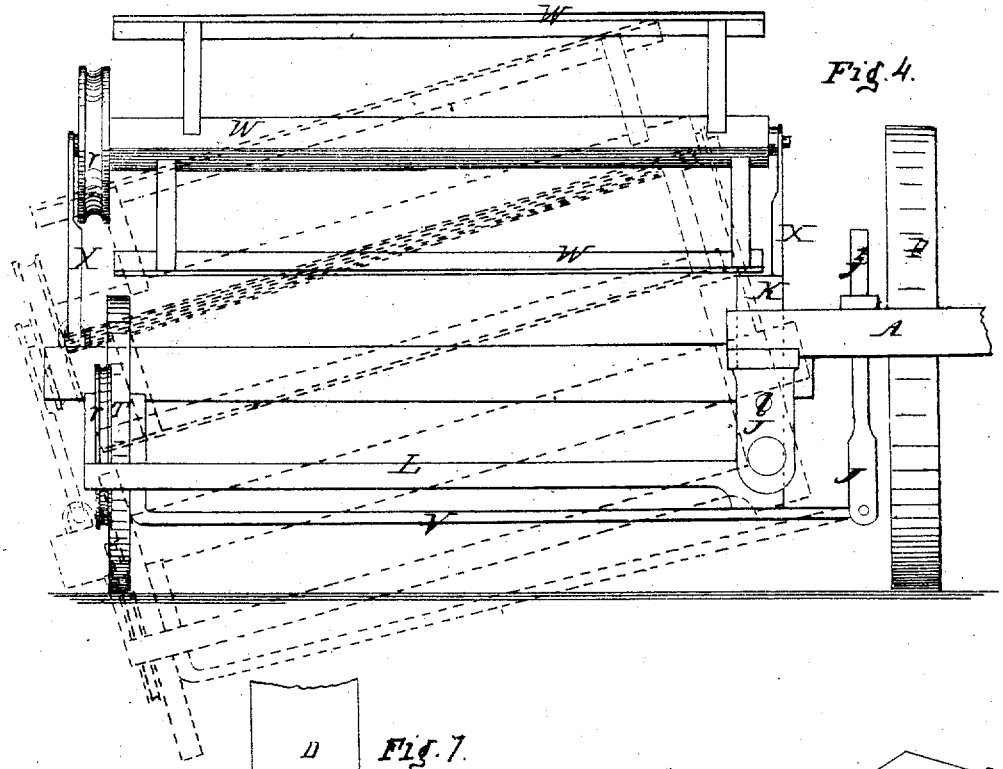
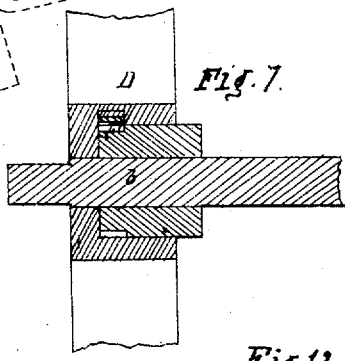
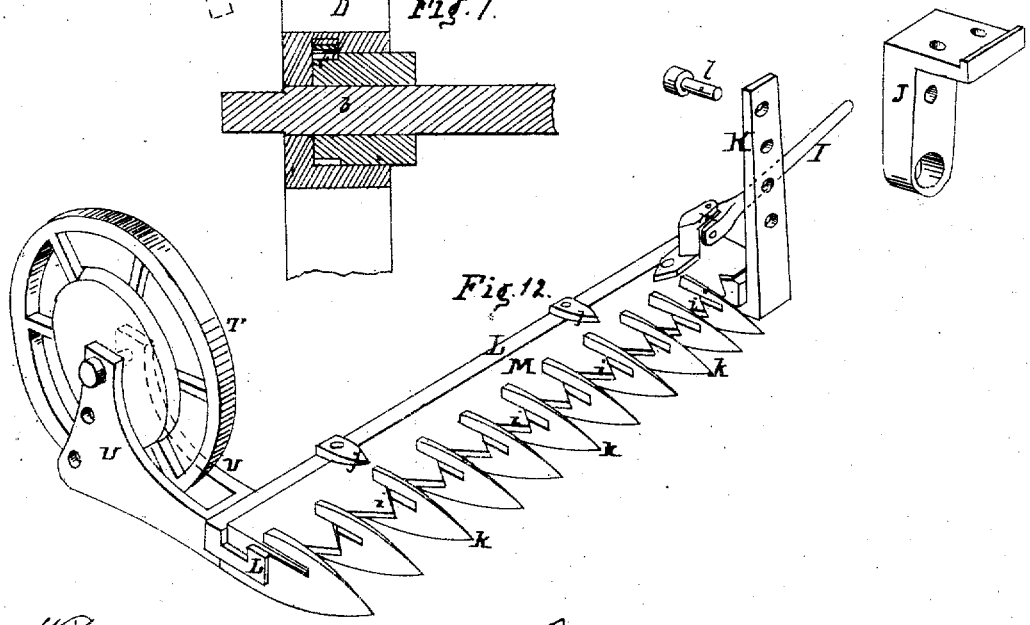
Witnesses
Edw. Schafer
E. W. Griffin
R. T. Campbell Assignee of
Thomas J. Stealey.

4 Sheets
Sheet 4

T. I. Stealey.

Harvester Rake.

No. 2783 Reissued Oct. 22, 1867.

Witnesses
Edw. Schaefer
E. W. Coffin

R. J. Campbell Assignee of Thomas J. Stealey

UNITED STATES PATENT OFFICE.

ROBERT T. CAMPBELL, OF WASHINGTON, DISTRICT OF COLUMBIA, ASSIGNEE OF THOMAS I. STEALEY.

IMPROVEMENT IN REAPERS AND MOWERS.

Specification forming part of Letters Patent No. 18,871, dated December 15, 1857; reissue No. 2,388, dated November 6, 1866; reissue No. 2,783, dated October 22, 1867.

*To all whom it may concern:*

Be it known that THOMAS I. STEALEY, formerly of Middlebourne, in the county of Tyler and State of Virginia, but now a resident of Wheeling, in the State of West Virginia, did invent certain new and useful Improvements in a Reaper and Mower; and your petitioner hereby declares that the following is a full, clear, and exact description thereof, reference being had to the accompanying drawings making a part of this specification, in which—

Figure 1:
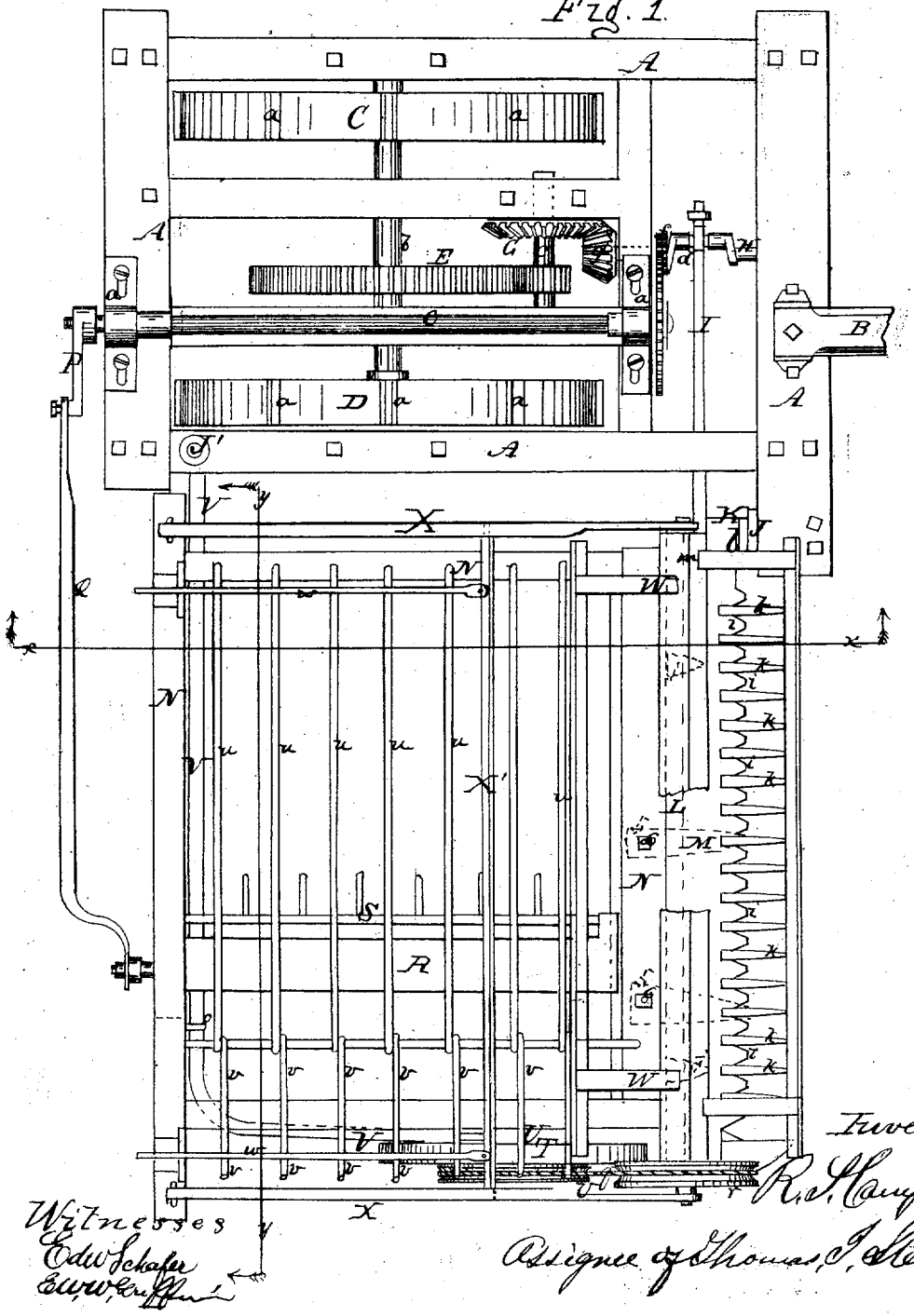
Figure 11:
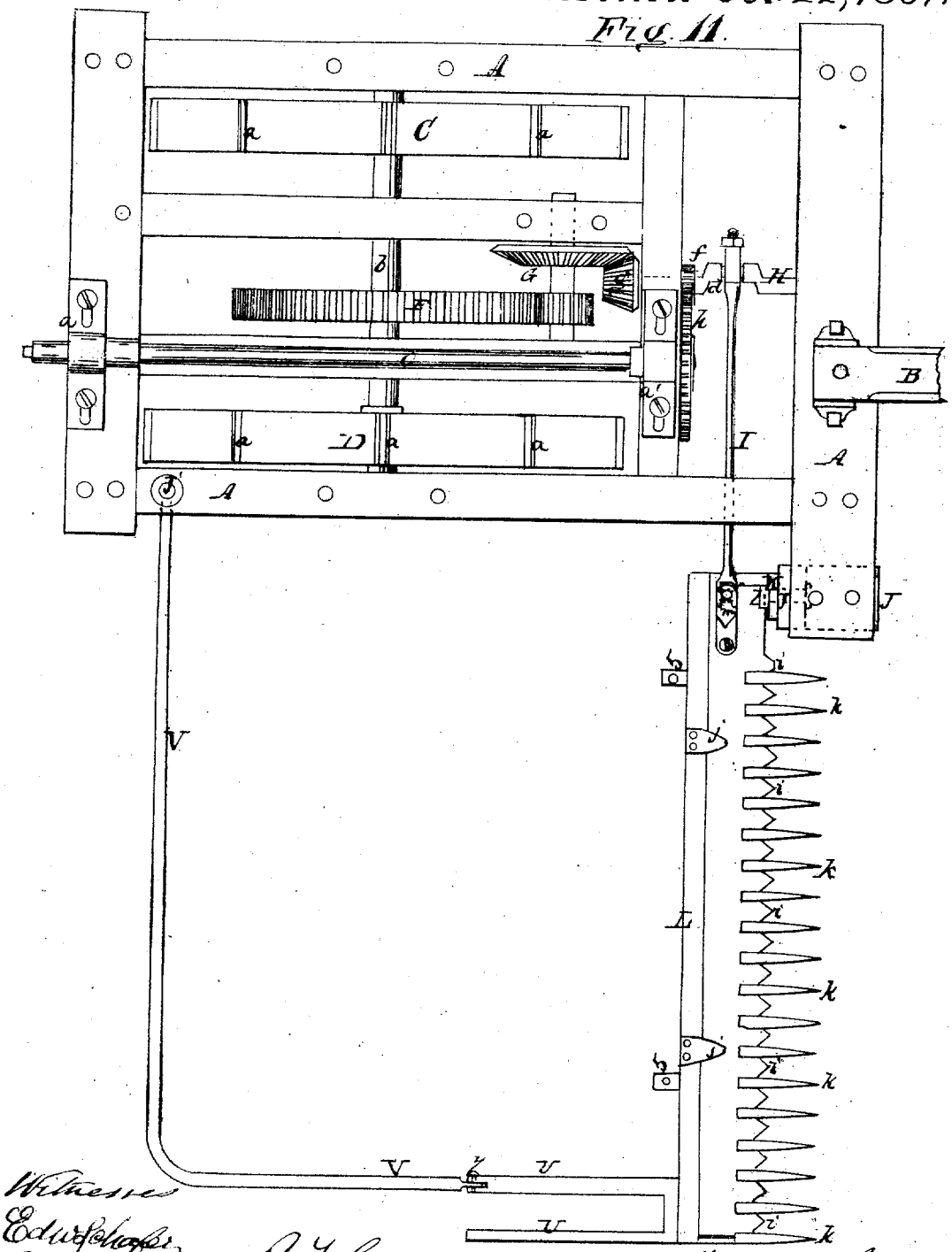

Figure 1, Sheet 1, is a plan view of the machine arranged as a reaper. Fig. 2, Sheet 1, is an elevation of the outer end of the machine. Fig. 3, Sheet 1, is a longitudinal section, taken through Fig. 1, in the vertical plane indicated by red line *x x*. Fig. 4, Sheet 2, is a front elevation of the finger-beam and a portion of the draft-frame, showing the mode of connecting these parts by a joint. Fig. 5 is a section, taken in the vertical plane indicated by red line *y y*, Fig. 1, looking toward the rear of the machine. Figs. 6 and 7 are views, in section, of a mode of connecting one of the transporting-wheels to its axle. Figs. 8 and 9 are enlarged views of the pitman-rod and its connections for moving the sickle. Fig. 10 is a perspective view of one of the teeth. Fig. 11 is a top view of the machine as arranged for mowing, the grain-wheel, the platform, and the rake being removed and the cutting apparatus lowered, so as to allow the outer end of finger-beam and outer shoe to run upon the ground. This view shows the office of the brace V while using the machine as a mower. Fig. 12 is a perspective view of the cutting apparatus as adjusted for mowing, the outer or grain-wheel being in place, but adjusted so as to allow the shoe at outer end of finger-beam to come close to the ground. In this view of drawing the adjusting devices of the inner end of the finger-beam are shown disconnected from one another.

Similar letters of reference indicate corresponding parts in the several figures.

To make a good practical reaping and mowing machine combined I believe it is desirable to have a draft-frame, with a tongue at its forward end, two driving and supporting wheels, one of which is loose on its axle, but connected to the same by means of a ratchet and spring-pawl, or the equivalent thereof, so that said loose wheel may momentarily, as it were, cease its driving-connection with the axle while the machine is being turned round corners. It is also desirable that the finger-beam and platform should be on one side of the draft-frame, and hinged to the draft-frame in such a manner as that they shall be capable of rising and falling at their outer ends, above and below the plane on which the draft-frame runs during the operation of reaping or mowing, in order to accommodate themselves to the undulations of the ground, independently of said draft-frame. It is also desirable that the devices by which the connection of the finger-beam and platform with the draft-frame is effected should be adjustable free joints or adjustable flexible connections, in order that the "height of cut" may be varied, and that there should be at least two of such devices, one of which is auxiliary to the one which hinges and holds up the inner end or heel of the finger-beam, in order that the platform may be properly sustained in rear of the finger-beam joint, and that the pitch of the guard-fingers may be varied to suit circumstances. It is also desirable to have a brace to the finger-beam, between it and the draft-frame, such brace serving, while reaping, to hold up the rear part of the platform, as well as to brace the finger-beam, and, while mowing, to brace the finger-beam only. This brace should have a joint connection with the cutting apparatus and with the draft-frame, so as to follow the finger-beam as it rises and falls above and below the plane on which the driving-wheels of the draft-frame run. And to make a combined reaper and mower and self-raker, it is desirable that a toothed rake be provided, which will deliver the cut grain at intervals and in gavels from the platform, at the inner side thereof, and out of the path of the team on the return of the machine to cut the next swath, and that this rake be so combined with the hinged finger-beam and platform, and driven from the draft-frame, that it will follow unchangingly the vibrations of the platform and finger-beam as they move over the undulating surfaces of the ground, and thus all work harmoniously together. And it is also desirable that such rake, together with the platform and other reaping fixtures employed, should be removable, in order to convert the machine from a reaper and self-raker into a mower. And to make a combined hinged-joint machine which will answer a good purpose as a mower, or as a reaper, mower, and self-raker combined, and which will operate with but a slight vertical deflection of the sickle, it is desirable that the draft-frame be adapted for carrying the gearing for driving the cutters forward of the main axle, and that the shafts of the gearing should all be arranged below the top of the draft-frame, and as near down to the plane in which the sickle moves as practicable, and that the finger-beam and sickle be arranged forward of the main axle, or as far forward as will make the machine a "front-cut," instead of a "rear-cut" machine; and also means for raising and lowering the points of the guard-fingers so as to enter under "beaten-down" crops. In such a machine it is desirable, in order to have perfect harmony of action between the different elements thereof, to arrange the reel, which brings the standing grain up to the cutters, upon the hinged finger-beam or platform, so that its support is wholly independent of the draft-frame. And, finally, it is desirable to have all the elements of such a machine so arranged that there is room upon the draft-frame for the driver to ride while the machine is in operation.

The machine which I have represented in the drawings, and which I shall now proceed to describe, contains all of the desirable features of construction above mentioned, and its special design when first invented was to serve the purposes of the two separate and distinct machines then sold in the market—viz., the machine known as a "reaper," answering only for cutting grain, and the machine known as a "mower," answering only for cutting grass or similar crops.

Having thus stated the general principle of this invention, I will now proceed to describe in detail one of the methods by which that principle is to be carried into effect, in order to enable any one skilled in the art to make and use the thing invented.

The driving parts of the machine are mounted in a rectangular draft-frame, A, of suitable dimensions, and to this frame the pole or draft-tongue B is secured in any suitable manner. The supporting-wheels C D may properly be made of cast-iron, of sufficient weight and size, and provided with spurs *a a*, to secure a firm hold upon the ground. One of these wheels, C, being the driving-wheel, should be firmly secured to its axle *b*, while the other, D, may turn freely upon the axle; or a ratchet-wheel, F, shown in Figs. 6 and 7, Sheet 2, may be placed within or at the side of its hub, in order to enable this wheel, also, to assist in driving the working parts, and at the same time adapt itself to any difference of speed which may be required of the two wheels by turning the machine. On the axle *b*, which is in bearings beneath the draft-frame, a large spur-wheel, E, is keyed, which engages with a pinion spur-wheel, *e*, and on the transverse shaft *c* of this pinion *e* a beveled spur-wheel, G, is keyed, which engages with a suitable pinion, *g*, on the longitudinal crank-shaft H. From the crank *d* of shaft H a pitman, I, extends to the cutting-bar M, with which it is connected by a universal joint, *m*. This construction of joint allows a free motion and adjustment of the finger-beam and cutter-bar in every direction, and at the same time admits of the joint being made strong and closely fitting, so as to avoid undue friction and wear at this point. The pinion-shaft *c*, and also the crank-shaft H, are supported in bearings, which are located beneath the draft-frame, as shown in Fig. 3, so as to have less inclination of the pitman-rod I, and also to leave the front part of the draft-frame clear. The inner end of the pitman-rod I is constructed with half-boxes 1 2, which receive between them the crank-wrist *d*. The half-block 1 is fitted into the forked end of the pitman-rod, and the block 2 is firmly secured on this end of the pitman by means of studs and nuts 3 3. The boxes or blocks 1 2 are not set close together, in order that as they wear away around the wrist *d* they may be easily tightened again by setting up the nuts 3 3. Thus this point of connection of the pitman can be prevented from working too loose, or so loose as to cause an irregularity in the movement of the sickle with respect to the guard-fingers. The blocks 1 2 may be made of brass, or some suitable bearing-metal different from that of which the crank-pin *d* and pitman are made, for the purpose of increasing the smoothness of the joint. The cutter-bar M is sunk entirely into and slides in a groove in the upper side of the finger-bar L, where it may be secured by fixed tongues *j j*. The cutters *i i* may be separately secured to the cutter-bar or compose a single cutter-blade, to be attached thereto. The guard-fingers *k k* are secured to the under side of the finger-bar L, and the notches or grooves through which the cutters slide should be sufficiently wide to allow space enough above these cutters to prevent the clogging of grass or grain therein. The lower cutting-edges of the cutters should, of course, move in close contact with the lower sides of the finger-notches. The base of the notches or slots or grooves of the guard-fingers is on a plane with the top of the finger-beam. The finger-bar L is provided with an arm, K, projecting perpendicularly upward from its inner end, or that end which is nearest the draft-frame.

This arm is provided with a set of holes, at regular distances apart, as shown by dotted lines in Fig. 3, through any one of which a bolt, *l*, passes loosely, and also through a large hole in a bearing or hanger, J, which is attached rigidly to the frame A. The holes for the bolt *l* in hanger J are of larger diameter than the pin, so as to allow the rear of the platform to rise or fall. On this bolt the finger-bar freely oscillates or vibrates, so that it can be raised as far as necessary from the ground at its outer end, or adapt itself to any unevenness of the surface of the ground. The outer end of the finger-bar L is supported upon the ground by a wheel, T, which runs in bearings U U, projecting backward from the outer end of said finger-bar. These bearings have a set of vertically-arranged holes *s s s*, Fig. 2, corresponding, in their distance apart and height, with the holes in the arm K, which is fixed to the inner end of the finger-beam. The axle *b* of the wheel T is inserted into any of these holes, *s*, corresponding with the hole in the arm K, which receives the pivot-bolt *l*, and thus the finger-bar is adjusted to any height from the ground desired, so as to leave a shorter or longer stubble at pleasure, also leaving the hinge-movement of the finger-bar free and unimpeded in all adjustable positions given to said finger-bar. This vertical adjustment and the hinge-movement of the finger-bar do not in the least interfere with the motion communicated to the cutter-bar, since the employment of the crank and pitman for actuating the cutters admits of such movement and adjustment without derangement; and the universal joint, which connects the pitman to the cutter-bar, prevents the possibility of binding the motion of said bar.

The platform N, upon which the cut grain falls, is suitably secured at its front edge to the rear edge of the finger-bar L, by means of brackets 5 5 and screw-bolts 6 6, so as to be removable. At the rear edge of this platform is a strong brace or bar, V, one end of which projects from the inner corner of said platform, and is hinged by a pivot-bolt, *g*, Fig. 3, to a hanger, J′, which extends down from the draft-frame A. The outer end of this brace hinges at 7 to the outer shoe. (See Fig. 11.) The hanger J′ is applied to its frame A, so as to be self-adjustable vertically—that is to say, this hanger will rise and descend freely with the platform N, to which it is jointed, and prevent the rear inner end of the latter from descending below the desired level without restraining its outer end. The joint at outer end of the brace permits the movement just mentioned. The hanger J′ thus forms a free or flexible connection, and it is located in rear of the finger-beam joint, and out of the way of a rake when one is used. By means of the nut which is applied to rod J′ on top of the frame A the rear part of the platform can be raised or lowered, as circumstances may require that the points of the guard-fingers be pitched up or down. Thus it will be seen that while the outer ends of the finger-beam and platform are supported by means of a wheel or its equivalent, which runs upon the ground, neither the finger-beam joint nor its platform, or auxiliary supporting connection J′, with the main frame, will prevent the outer parts of the finger-beam and platform from conforming to the undulations of the ground. This mode of sustaining the inner part of the platform in rear of the finger-beam joint, admits of adjusting the rear of the platform to different heights independently of or in conjunction with the forward adjustment of the finger-beam. The hanger J′ and the brace V sustain the finger-beam in mowing against back thrust. Transversely over the rake-frame a set of rods, *u u*, or their equivalents, are secured, substantially as represented, to receive the falling grain, and their outer ends *v v* turn upward at an inclination which will keep the grain above the wheel T, and throw it inward at the outer edge sufficiently to be reached by the rake, and also to give room for the teeth of the rake to turn up beneath. The grain is delivered by the rake over the inner edge of the platform, and deposited upon the ground, out of the path of the team in the next passage around the field.

The rake S is located just beneath the rod *u*, so that its teeth, when upright, will project upward beyond them and the grain which is lying across them. The rake bar or head is pivoted at ends in a carrier, R, the rear end of which its slides between ways *n n*, located transversely along the rear edge of the platform. This cross end, which slides in the ways *n n*, is extended as far as the construction of the reaper will admit, in order to give a long bearing in the ways, and thereby prevent the rocking of the carrier from its proper position, so as to impede its free motion. The rake-head, being pivoted in its bearings, so as to turn freely forward one-fourth of a circle, or thereabouts, will, as soon as it begins to retreat from the terminus of its inward movement, after having cast off a bunch of grain, allow its teeth to fall by their own weight, or by reason of the slightest resistance offered by the grain which lies on the supporting-rod *u u* to a horizontal position, as shown in Fig. 5. In order to raise the teeth again to a vertical position for action at the outer termination of the rake's movement a cam projection, *p*, Fig. 5, is secured to the rake-head at one end, and a stop, *o*, is attached to the platform in a proper position to act upon the cam *p* just as the rake reaches the outer termination of its stroke. When once the rake-teeth are brought to a vertical position, the rake-head not being allowed to turn back any further, the resistance of the grain against which the teeth are drawn keeps them upright during the inward stroke of the rake. The reciprocating motion is communicated to the rake through a pitman, Q, extending from a crank, P, to the rake-carrier R. This crank is secured to a shaft, O, which extends forward over the frame A, and receives a rotary motion from a pinion, *f*, on the crank-shaft H, through a gear-wheel, *h*, on the front end of the said shaft O. In order to vary the speed of the rake the gear-wheel *h* can be readily removed, and others of different size used; and in order to make the several sizes of these gear-wheels engage properly into the pinion *f* the bearings *a a* of the shaft O are made laterally adjustable on frame A, as shown in the drawings, or in any other convenient manner. The employment of the crank and pitman P Q for communicating the motion to the rake allows this adjustment to be made without in the slightest degree disarranging the action of the rake, as well as allowing the vertical adjustment and hinge-movement of the rake-frame without disarrangement of any part. To avoid variation of the limits of the rake's movement by the adjustment of the bearings *a' a'* the pitman Q may be lengthened or shortened by using a set of holes therein to receive the wrist of the crank P. By means of the adjustable bearings the rake can be thrown out of gear, if desirable, while the machine is being used as a mower.

The reel W is supported by arms X X, which are hinged to the back part of the platform N, as represented in the drawings, whereby the reel may be swung over to the standing grain without interfering with the deposit of the falling grain or with the operation of the rake beneath. It is often requisite also to have free access to the top of the platform, and this method of hinging the reel thereto enables it to be swung back out of the way in such cases. At some distance from the lower ends of the swinging arms X X braces *w w* are hinged to a bar, X', connecting the arms X, for the double purpose of strengthening the reel-frame and furnishing a support for these braces, which extend downward a sufficient length to reach the upper edge of the platform N, in whatever position the reel may be placed. The lower ends of said braces are curved, and notched in the outer edges of the curved portions, substantially as shown in Fig. 2. These notches receive or bear against the corners of the upper edge of the platform, which should be a few inches lower than the joints of the arms X. The effect of this arrangement of the notched braces is to retain the reel at various heights, according to the particular notches which rest against the platform, whether the reel is swung forward to the standing grain, as shown in black lines in Fig. 2, or swung back off from the platform, as indicated in red lines in the same figure, and at the same time they brace or firmly hold the reel in the different positions by reason of the eccentricity of their points of support on the platform from the center of the reel's swinging movement. Motion is imparted to the reel by means of pulleys *r r* attached respectively to the reel-shaft and to the wheel T or its axle *t*, and of a band, *q*, connecting said pulleys. The band *q* is unclasped from the pulleys when the reel is to be swung back, and it may be lengthened or shortened, in any convenient manner, for adjusting the reel to different heights from the platform to adapt it to grain of different heights.

It will be seen from this description of one mode of carrying out the invention that the reel and the rake are both supported upon the platform, and that they have no support upon the draft-frame, said platform being hinged at its inner end to the draft-frame, and supported upon the ground at its outer end, so as to conform to the undulations thereof when the machine is in operation. It will also be seen that the platform N is so hinged to the draft-frame that this platform has a free vertical vibrating movement. With such a platform, and a reel having its support upon it, and a rake also supported wholly upon it, a perfectly harmonious movement of these parts is obtained, without having any of the parts liable to bind and work hard. By this arrangement the objection attending reels which are partly supported upon the draft-frame and partly upon the platform is obviated.

When the machine is to be used as a mower the platform, with rake and reel attached, is removed by unscrewing the bolts 6 6, by which it is fastened to the brackets 5 5 of the finger-beam. The outer wheel of platform is also removed, but, if desirable, it may remain on the shoe after the cutting apparatus and finger-beam are adjusted from the position which enables the machine to serve as a reaper to a position which enables it to serve as a mower. In the removal of the platform, rake, and reel, as above mentioned, the pitman of the crank-shaft which drives the rake is also removed, and by slipping the bearing-plates of the crank-shaft to the right the rake-gearing will be ungeared.

I am aware that a reel which is wholly mounted upon a hinged platform has been combined with an endless apron upon such platform, which apron delivered the cut grain from the inner side of the platform. Such an arrangement is found in the patent of T. N. Lupton, dated May 8, 1855. But that apron would not deliver the grain in bundles like an intermittently-moving rake, which is so constructed and operated as to allow the cut grain to lie upon the platform until a sufficient amount has been thus accumulated, and then to rake it off. Neither is there provision made in Lupton's patent for raising and lowering the platform or cutting apparatus to suit different heights of grain to be cut, in conjunction with his reel and endless carrier.

Having thus described one mode of carrying out this invention, I wish to be understood that I do not confine myself to the precise contrivances herein described.

What I claim as new under this patent is—

1. The main frame of a harvester, which carries the gearing to drive the cutters, and to which frame the tongue is attached, said frame being carried by two driving and supporting wheels, and having the finger-bar and platform hinged to it, so as to rise and fall at their outer end, above and below the plane on which the driving-wheels run, in combination with a rake moving over the platform at intervals, and discharging the cut grain at the inner side of the platform, and out of the path of the team in cutting the next swath.

2. In a harvester with a finger-bar and platform hinged to the draft-frame thereof, so as to rise and fall at their outer end, above and below the plane on which the driving-wheels run, applying the pivot or fulcrum of the rake and its guide to the finger-bar and platform, so that the rake will work in unison with the finger-bar and platform through all the vibrations of the finger-bar and platform.

3. In combination with a harvesting-machine having two driving and supporting wheels, which carry the main frame, with a finger-bar hinged to said frame, so as to rise and fall at its outer end, above and below the plane on which the driving-wheels run, the removable platform and self-raking attachment, and the other reaping fixtures, which, when removed, convert the reaper into a mower.

4. So combining a two-wheeled draft-frame, a hinged platform, rake-teeth, and reel-bars that the rake-teeth and reel-bars are wholly to one side of the draft-frame, substantially as described.

5. A finger-beam of a combined reaper and mower, hinged to and suspended below the draft-frame by means of a jointed connection, which allows of its outer end rising and falling above and below the plane on which the driving-wheels run, and by which its inner end can be raised or lowered, to adapt the cutting apparatus for reaping or mowing, in combination with an auxiliary suspending and bracing, jointed, or flexible connection, which is adjustable, and will hold up and brace a grain-platform at its inner side, and in rear of the hinge of the finger-beam, when the machine is used as a reaper, and will brace the cutting apparatus while the machine is used as a mower, substantially as described.

6. The combination, in a two-wheeled side-draft combined reaping and mowing machine, of a laterally-projecting hinged cutting apparatus, which rises and falls at its outer end, above and below the plane on which the driving-wheels run, a platform for receiving the cut grain, and a toothed rake which discharges the cut crop in gavels from the platform, at the inner side thereof.

7. A harvesting-machine with its cutting apparatus hinged, so as to be on one side of a two-wheel draft-frame, and so as to rise and fall at its outer end, above and below the plane on which the drive-wheels run, when such machine is constructed so as to be capable of serving either as a mower or as a combined reaper, mower, and self-raker, substantially as set forth.

8. A harvester, with a two-wheel draft-frame, which has one of its wheels connected to the main axle by means of a spring-pawl and a ratchet, or equivalent devices, which will allow and cause it automatically to become a loose or fast wheel on said axle in backing the machine or turning it around corners, and with the shafts of its gearing for driving the sickle arranged below the main axle. and with said axle and said gearing below its main frame, and with its finger-beam hinged to it in such a manner as to make it a front-cut machine, and so that the outer end of said finger-beam may rise and fall above and below the plane on which the driving-wheels run, and provided with an auxiliary rear-supporting brace attached to the platform or finger-beam, so that the same is braced against the resistance of the crops as the machine moves forward, substantially as set forth.

9. A front-cut harvesting-machine, which can be used either as a mower or as a self-raking reaper, such machine having a laterally-projecting hinged cutting apparatus, and having a rake which discharges the cut crop in gavels from the inner side of the platform.

R. T. CAMPBELL.

Witnesses:
EDW. SCHAFER,
EDM. F. BROWN.